United States Patent Office 2,772,280
Patented Nov. 27, 1956

2,772,280

SYNTHESIS OF 4-AMINO-3-ISOXAZOLIDONE AND ITS DERIVATIVES

Robert Lawrence Peck, deceased, late of Plainfield, N. J., by Helen McLean Peck, administratrix, Plainfield, N. J., assignor to Merck & Co., Inc., Rahway, N. J., a corporation of New Jersey No Drawing. Application December 23, 1954,
Serial No. 477,398

23 Claims. (Cl. 260—307)

This invention relates to novel chemical compounds and particularly to novel compounds useful as intermediates in the synthesis of 4-amino-3-isoxazolidone and its derivatives, and to processes for preparing these intermediates.

It has now been found that 4-amino-3-isoxazolidone compounds can be synthesized by reactions indicated as follows:

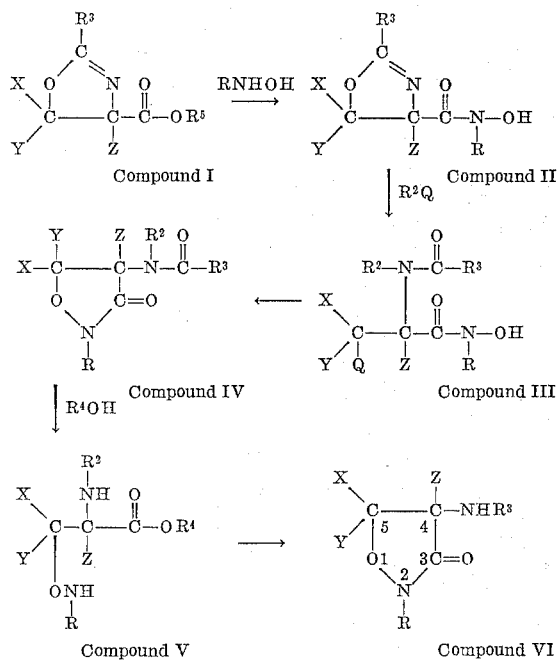

In the above formulae X, Y, and Z are hydrogen or alkyl, aralkyl, or aryl groups containing from one to eight carbon atoms and may be the same or different groups; R and $R^2$ are hydrogen or alkyl or aralkyl groups containing from one to eight carbon atoms and may be the same or different groups; $R^3$ is an alkyl, aryl, or aralkyl group containing from one to eight carbon atoms and may be the same or different groups, $R^4$ is a lower alkyl group, $R^5$ is a one to eight carbon atom alkyl group, and Q is a bromo, chloro, or iodo group.

The reactions indicated are conducted as follows: a 4-carboalkoxy-8-oxazoline compound (Compound I) is reacted with a hydroxylamine in the presence of a base to produce a 4-carbohydroxamido-2-oxazoline compound (Compound II). This latter compound is then reacted with an ionizable halide compound to form a β-halopropionohydroxamic acid compound (Compound III) which when treated with a base cyclizes to form a 4-amido-3-isoxazolidone compound (Compound IV). This compound is then reacted with an alcohol under acidic conditions to produce an α-amino-β-aminoxypropionate compound (Compound V) which is treated with a base to form a 4-amino-3-isoxazolidone compound (Compound VI).

This invention is concerned with the α-amino-β-aminoxypropionate compound (Compound V), an intermediate in the above synthesis, having the general formula—

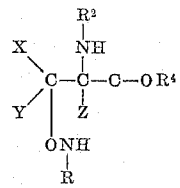

wherein X, Y, Z, R, $R^2$ and $R^4$ are as defined above.

This invention is also concerned with the process for preparing the α-amino-β-aminoxypropionate compound from the 4-amido-3-isoxazolidone compound and its conversion to a 4-amino-3-isoxazolidone compound.

The α-amino-β-aminoxypropionate compound is prepared by reacting the 4-amido-3-isoxazolidone compound having the general formula—

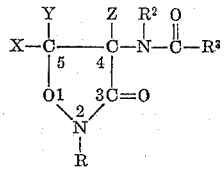

wherein X, Y, Z, R, $R^2$, and $R^3$ are as defined above, with an alcohol under acidic conditions to produce the α-amino-β-aminoxypropionate compound. The alcohol has the general formula $R^4OH$ wherein $R^4$ is a lower alkyl group. Examples of suitable alcohols are methanol, ethanol and n-propanol. The reaction is preferably carried out under reflux and in the presence of a mineral acid such as hydrochloric acid, hydrobromic acid or sulfuric acid. The product is isolated as the acid addition salt, which can be precipitated in crystalline form by the addition of a non-solvent for the material, such as chloroform or ether, to an organic solvent solution of the desired product. Typical examples of α-amino-β-aminoxypropionate compounds which can be prepared are β-aminoxyalanine methyl ester; β-aminoxyalanine ethyl ester; ethyl-α-amino-β-aminoxy-butyrate, β-aminoxy-N-benzylalanine ethyl ester and β-(N-methylaminoxy)-alanine ethyl ester.

The α-amino-β-aminoxypropionate compound is treated with a base to form the corresponding 4-amino-3-isoxazolidone compound. This is accomplished by treatment with solutions of organic bases such as methylamine, ethylamine, pyridine or quaternary amines, or inorganic bases such as alkali or alkaline earth metal hydroxides or carbonates or with ammonium hydroxide.

The base is preferably an aqueous solution of an alkali metal hydroxide of such concentration that the theoretical yield of product forms about a 15% solution of product having a pH of 10 to 11. The product can be isolated by dilution of the solution with eight volumes of one part ethanol to one part isopropyl alcohol followed by filtration and acidification of the filtrate to pH 6.0 with glacial acetic acid. The 4-amino-3-isoxazolidone compound is recovered as the DL mixture which may be resolved to obtain the L form. Typical examples of 4-amino-3-isoxazolidone compounds are 4-amino-3-isoxazolidone; 4-amino - 5-methyl-3-isoxazolidone; 4-(N-benzylamino)-3-isoxazolidone, and 2-methyl-4-amino-3-isoxazolidone.

The 4-amino-3-isoxazolidones are useful as bactericidal and/or bacteriostatic agents. They are also of value as growth promoting agents in animals. These compounds may also prove to be useful in topical application since they appear to have pronounced activity against a large number of both gram-positive and gram-negative bacteria.

In this regard it should be noted that the DL form of 4-amino-3-isoxazolidone has shown about ten times the activity of the D isomer against *D. pneumoniae*. The compounds are also useful for combating bacterial disease in plants and trees.

The following examples are given for purposes of illustration:

EXAMPLE 1

*Methyl α-amino-β-aminoxypropionate dihydrochloride*

A solution of .500 g. (0.00242 mole) of 4-benzamido-3-isoxazolidone in 10 ml. of dry methanol saturated with hydrogen chloride was refluxed for three hours. The reaction mixture was added to 50 ml. of dry ether and a gummy precipitate which crystallized on standing was formed. The solid, weight .383 g. (yield 76.5%), melting point 133–40° C., was collected on a filter. Recrystallization of the crude methyl α-amino-β-aminoxypropionate dihydrochloride from ethanol gave material melting at 133–136° C. with resolidification occuring at 140–160° C., followed by decomposition at 165° C. *Anal.*—Calcd.: C, 23.20; H, 5.83; N, 13.53; Cl, 34.24. Found: C, 21.50; H, 6.07; N, 13.53; Cl, 29.90. In a similar manner the ethyl ester is formed by refluxing with ethanol.

EXAMPLE 2

*Methyl α-amino-β-aminoxybutyrate*

A rapid stream of hydrogen chloride was passed into 250 ml. of dry methanol for approximately forty minutes. To this solution was added 5 grams (0.0227 mole) of 4-benzamido-5-methyl-3-isoxazolidone and the solution refluxed in two hours. After removal of the methanol on an aspirator, the residue was pumped 48 hours to dryness. An attempt to dissolve the crystalline residue in 150 ml. of boiling isopropanol left 2.11 grams (0.00953, 42%) of crystalline methyl α-amino-β-aminoxybutyrate dihydrochloride, melting point 139–145° C. A small sample triturated with boiling isopropanol melted at 136–138° C. *Anal.*—Calcd.: C, 27.16; H, 6.38; N, 12.67; Cl, 32.07. Found: C, 27.44; H, 6.46; N, 12.46; Cl, 31.27.

EXAMPLE 3

*DL-4-amino-3-isoxazolidone*

A solution of .225 gram (.00109 mole) of methyl α-amino-β-aminoxypropionate dihydrochloride in 4.0 ml. of 1.0 N sodium hydroxide was allowed to stand for one-half hour. After addition of 1.6 ml. of 1.16 N (.00183 moles) hydrochloric acid the solution was stirred for one-half hour with each of three ten ml. portions of the anion exchange resin, IRA–400 (basic cycle). The resin was then twice stirred with 50-ml. portions of water while carbon dioxide was bubbled into the mixture. The aqueous extracts were combined and lyophylized to give .0275 gram (25%) of DL-4-amino-3-isoxazolidone having an indistinct melting point at about 121° C.

EXAMPLE 4

*DL-4-amino-3-isoxazolidone*

Two and seven one hundredths grams of methyl-α-amino-β-aminoxypropionate dihydrochloride was dissolved in 12.0 ml. of 2.51 N sodium hydroxide and the resulting solution diluted to 60 ml. with distilled water. After standing at 25° C. for about ten minutes, the solution was dried from the frozen state to yield 2.60 grams of solid residue. A portion of this product weighing 0.97 gram was dissolved in 6 ml. of water and brought to pH 11 with a few drops of aqueous potassium hydroxide. To the solution were added 25 ml. and 12 ml. portions of isopropanol, and finally 15 ml. of ethanol. The solution was chilled to 5° C. and adjusted to about pH 6 with glacial acetic acid. Crystals separated fairly promptly and were collected by filtration washed with isopropanol and ether and dried in vacuo to yield 74.5 mg. of substantially pure DL-4-amino-3-isoxazolidone.

EXAMPLE 5

*4-amino-3-isoxazolidone*

A solution of 73.3 grams (0.332 mole) of β-aminoxyalanine ethyl ester dihydrochloride in 100 ml. of water was stirred in a 500 ml. three-necked round-bottomed flask cooled in an ice-bath. To the above solution was added over a thirty minute period 65.6 grams (1.17 moles) of potassium hydroxide dissolved in 100 ml. of water. While the pH of the reaction mixture was 7–10.5, a red color appeared which disappeared when the pH reached 11–11.5. The light yellow solution was allowed to stand at room temperature for one-half hour and then added to 1800 ml. of 1:1 ethanol-isopropanol. The reaction flask was washed twice with 10 ml. portions of water and then washings added to the alcohol solution. The precipitated salts were filtered out of the alcohol solution and the filtrate cooled to 5° C. in a 5–1 three-necked round-bottomed flask. To the cold, well-stirred solution, was added dropwise over a 35-minute period sufficient glacial acetic acid to bring the pH of the alcohol solution to 6.0. When the pH of the solution had reached 7–7.5, the solution was seeded and no further acetic acid added until crystallization of the oil already precipitated had definitely begun. The crystalline precipitate was collected on a filter, washed twice with 1:1 ethanol-isopropanol and twice with ether. The yield of 4-amino-3-isoxazolidone was 22.7 grams.

EXAMPLE 6

*Methyl-α-amino-β-aminoxybutyrate*

A rapid stream of hydrogen chloride was passed into 250 ml. of dry methanol for approximately forty minutes. To this solution was added 5 grams (0.0227 mole) of 4-benzamido-5-methyl-3-isoxazolidone and the solution refluxed in two hours. After removal of the methanol on an aspirator, the residue was reduced to dryness and subjecting the mixture to a vacuum for 48 hours. An attempt to dissolve the crystalline residue in 150 ml. of boiling isopropanol left 2.11 grams (0.00953, 42%) of crystalline methyl-α-amino-β-aminoxybutyrate dihydrochloride, melting point 139–145° C. A small sample triturated with boiling isopropanol melted at 136–138° C. *Anal.*—Calcd.: C, 27.16; H, 6.38; N, 12.67; Cl, 32.07. Found: C, 27.44; H, 6.46; N, 12.46; Cl, 31.27.

EXAMPLE 7

*4-amino-5-methyl-3-isoxazolidone*

To a cold solution of 2.0 grams (9.05 moles) of methyl α-amino-β-aminoxybzutyrate dihydrochloride in 2 ml. of water was added dropwise a cold solution of 1.8 grams of potassium hydroxide in 2 ml. of water. During the addition of the alkali solution, the reaction mixture became pink and then colorless as the pH reached 11. After removal of the supernatant solution from the precipitated potassium chloride, the precipitate was washed twice with 0.5 ml. of water and these washings were combined with the supernatant solution. The solution was diluted with 40 ml. of 1:1 ethanol-isopropanol solution, the resulting mixture filtered, and the precipitate washed with a small volume of the 1:1 alcohol solution. After cooling the filtrate to 0–5° C. it was acidified to pH 6.0 by the dropwise addition of glacial acetic acid. The crystalline precipitate was 4-amino-5-methyl-3-isoxazolidone, .923 gram, (88% yield), melting point 160–165° C. Recrystallized 0.761 gram, melting point 170–173° C., of analytically pure product. *Anal.*—Calcd.: C, 41.36; H, 6.94; N, 24.13. Found: C, 41.31; H, 6.68; N, 23.88.

Any departure from the above description which conforms to the present invention is intended to be included within the scope of the claims.

What is claimed is:

1. A process which comprises reacting a 4-amido-3-isoxazolidone compound having the general formula

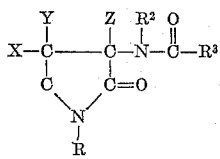

wherein X, Y and Z are selected from the class consisting of hydrogen and alkyl, aralkyl and aryl groups containing from one to eight carbon atoms and may be same and different groups, R and $R^2$ are selected from the class consisting of hydrogen and alkyl and aralkyl groups containing from one to eight carbon atoms and may be the same and different groups, and $R^3$ is selected from the class consisting of alkyl, aryl and aralkyl groups containing from one to eight carbon atoms, with an alcohol having the formula $R^4OH$ wherein $R^4$ is a lower alkyl group to produce the corresponding ester of an α-amino-β-aminoxy-propionate compound.

2. The process of claim 1 wherein the reaction is carried out in the presence of a mineral acid and the acid addition salt of the corresponding α-amino-β-aminoxy-propionate compound is produced.

3. The process of claim 1 wherein the alcohol is methanol.

4. The process of claim 2 wherein the mineral acid is hydrochloric acid.

5. A process which comprises reacting 4-benzamido-3-isoxazolidone with methanol to produce methyl-α-amino-β-aminoxy-propionate.

6. The process of claim 5 wherein the reaction is carried out in the presence of hydrochloric acid to produce the dihydrochloride acid addition salt of methyl-α-amino-β-aminoxy-propionate.

7. A process which comprises reacting 4-benzamido-5-methyl-3-isoxazolidone with methanol to produce methyl-α-amino-β-aminoxybutyrate.

8. The process of claim 7 wherein the reaction is carried out in the presence of hydrochloric acid to produce the dihydrochloride acid addition salt of methyl α-amino-β-aminoxybutyrate.

9. The process which comprises subjecting an α-amino-β-aminoxy-propionate compound selected from the group consisting of compounds having the general formula

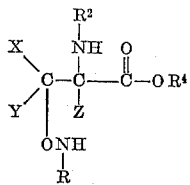

wherein X, Y and Z are selected from the class consisting of hydrogen and alkyl, aralkyl and aryl groups containing from one to eight carbon atoms and may be the same and different groups, R and $R^2$ are selected from the class consisting of hydrogen and alkyl and aralkyl groups containing from one to eight carbon atoms, and may be the same and different groups and $R^4$ is a straight chain lower alkyl group; and acid addition salts thereof, to alkaline conditions to produce the corresponding 4-amino-3-isoxazolidone compound.

10. The process of claim 9 wherein the alkaline conditions are produced by an aqueous solution of an alkali metal hydroxide.

11. The process of claim 9 wherein the reaction is carried out for at least one half hour.

12. The process of claim 9 wherein the 4-amino-3-isoxazolidone compound is separated from the reaction mixture by the addition of a mineral acid.

13. The process of claim 10 wherein the solution is at pH 10 to 11.

14. The process which comprises reacting a 4-amido-3-isoxazolidone compound having the general formula

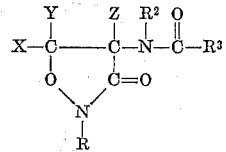

wherein X, Y and Z are selected from the class consisting of hydrogen and alkyl, aralkyl and aryl groups containing from one to eight carbon atoms and may be the same and different groups, R and $R^2$ are selected from the class consisting of hydrogen and alkyl, and aralkyl groups containing from one to eight carbon atoms and may be the same and different groups, and $R^3$ is selected from the class consisting of alkyl, aryl and aralkyl groups containing from one to eight carbon atoms, with an alcohol having the formula $R^4OH$ wherein $R^4$ is a lower alkyl group, to produce the corresponding ester of an α-amino-β-aminoxy-propionate compound having the general formula

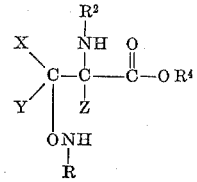

wherein X, Y, Z, R, $R^2$ and $R^4$ are as defined above and subjecting this compound to alkaline conditions to produce the corresponding 4-amino-3-isoxazolidone compound.

15. The process which comprises reacting 4-benzamido-3-isoxazolidone with methanol to produce methyl-α-amino-β-aminoxy-propionate and treating this compound with aqueous sodium hydroxide to produce 4-amino-3-isoxazolidone.

16. The process which comprises reacting 4-benzamido-5-methyl-3-isoxazolidone with methanol to produce methyl α-amino-β-aminoxybutyrate and reacting the compound with aqueous sodium hydroxide to produce 4-amino-5-methyl-3-isoxazolidone.

17. Compounds selected from the group consisting of compounds having the general formula

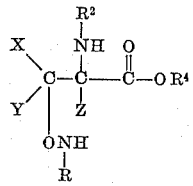

wherein X, Y, and Z are selected from the class consisting of hydrogen and alkyl, aralkyl and aryl groups containing one to eight carbon atoms and may be the same and different groups, R and $R^2$ are selected from the class consisting of hydrogen and alkyl and aralkyl groups containing from 1 to eight carbon atoms and may be the same and different groups and $R^4$ is a lower alkyl group; and acid addition salts thereof.

18. Methyl - α - amino - β - aminoxy - propionate.

19. DL methyl α - amino - β - aminoxy - propionate.

20. Methyl α - amino - β - aminoxy - propionate dihydrochloride.

21. Methyl β - aminoxy - α - aminobutyrate

22. Methyl β - aminoxy - α - aminobutyrate dihydrochloride.

23. DL methyl β - aminoxy - α - aminobutyrate.

No references cited.